United States Patent

[11] 3,579,069

| [72] | Inventors | Johann F. Reuteler<br>Elmwood;<br>James A. Warren, Simsbury, Conn. |
|---|---|---|
| [21] | Appl. No. | 668,037 |
| [22] | Filed | Sept. 15, 1967 |
| [45] | Patented | May 18, 1971 |
| [73] | Assignee | Pratt & Whitney Inc. |

[54] NUMERICAL MACHINE TOOL CONTROL SYSTEM INCLUDING MEANS TO DIGITALLY SIMULATE A TEMPLATE FOLLOWER
14 Claims, 12 Drawing Figs.

[52] U.S. Cl. .................................................... 318/571,
318/578, 318/608, 90/62, 90/13.99
[51] Int. Cl. ....................................................... G05b 19/24
[50] Field of Search ............................................ 318/20.110,
20.160, 20.370

[56] References Cited
UNITED STATES PATENTS
| 2,747,151 | 5/1956 | Jaeger | 318/(20.160UX) |
| 3,109,974 | 11/1963 | Hallmark | 318/(20.110UX) |
| 3,175,138 | 3/1965 | Kilroy et al. | 318/(20.370UX) |

*Primary Examiner*—T. E. Lynch
*Attorney*—Delio and Montgomery

ABSTRACT: This disclosure relates to a tracer-controlled machine tool adapted for numerical control. The contact gaps actuated by a tracer stylus to control the movement of a cutting tool is electrically simulated and the simulated tracer contact gap is varied with slide velocity. The gap is simulated by a comparison of a velocity signal with a signal proportional to servo position error or lag and the result of this comparison indicates an open or closed contact and actuates a slide drive means in response thereto. This comparison is further utilized to modify the slide velocity to maintain the servo position lag substantially proportional to slide velocity within predetermined limits.

Patented May 18, 1971

INVENTORS
Johann F. Reuteler
James A. Warren

BY Dedio and Montgomery
ATTORNEYS

Patented May 18, 1971
3,579,069
7 Sheets-Sheet 2
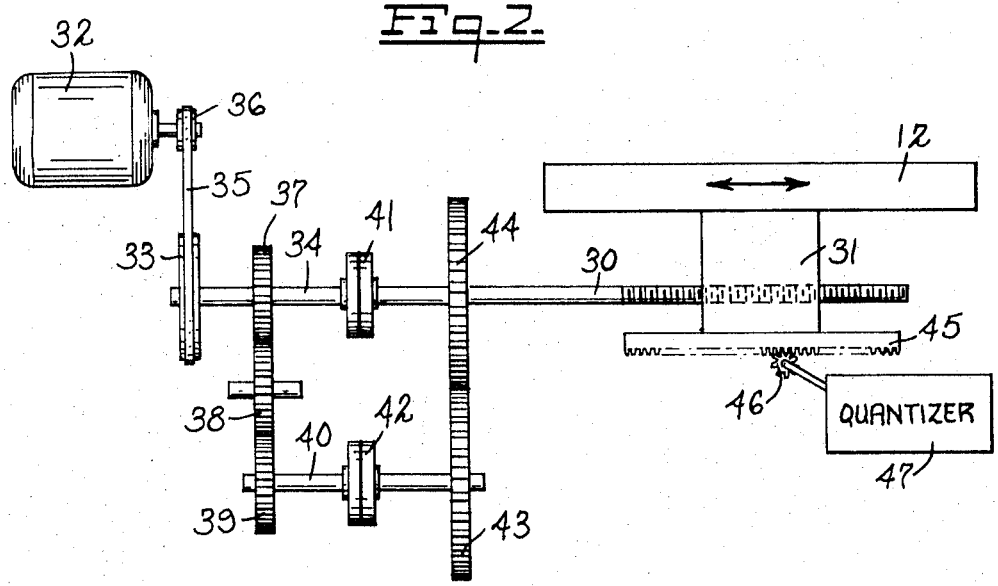
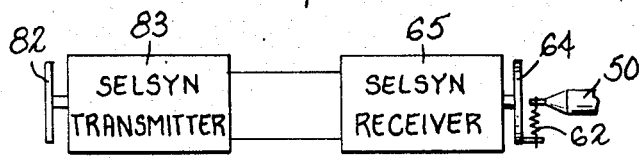
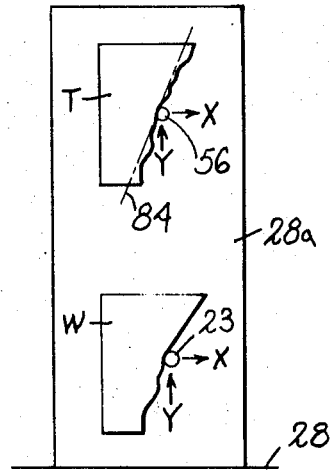
INVENTORS
Johann F. Reuteler
James A. Warren
BY DeLio and Montgomery
ATTORNEYS Patented May 18, 1971
3,579,069
7 Sheets-Sheet 3
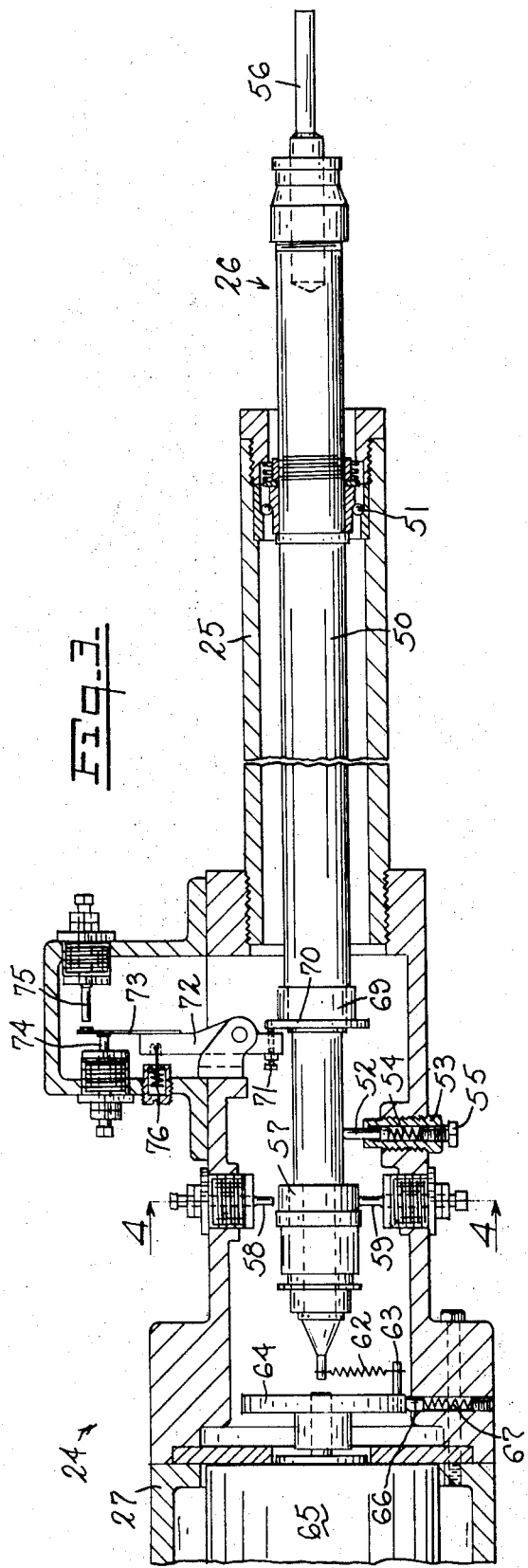
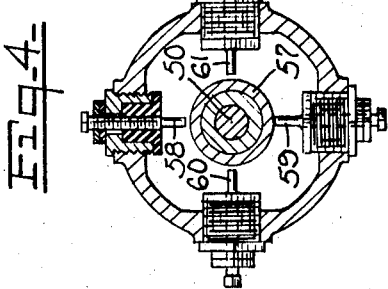
INVENTORS
Johann F. Reuteler
James A Warren
BY DeLio and Montgomery
ATTORNEYS

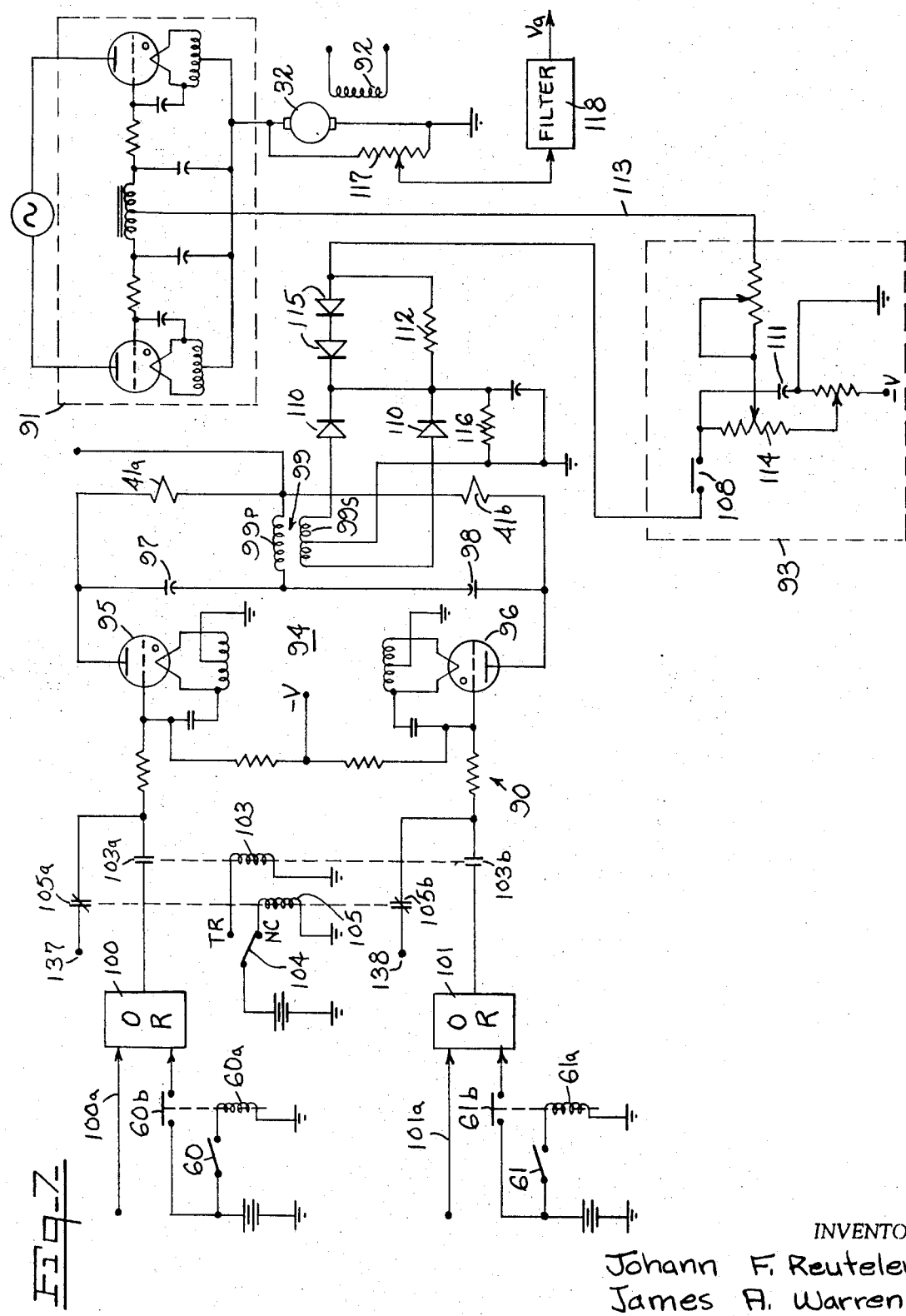

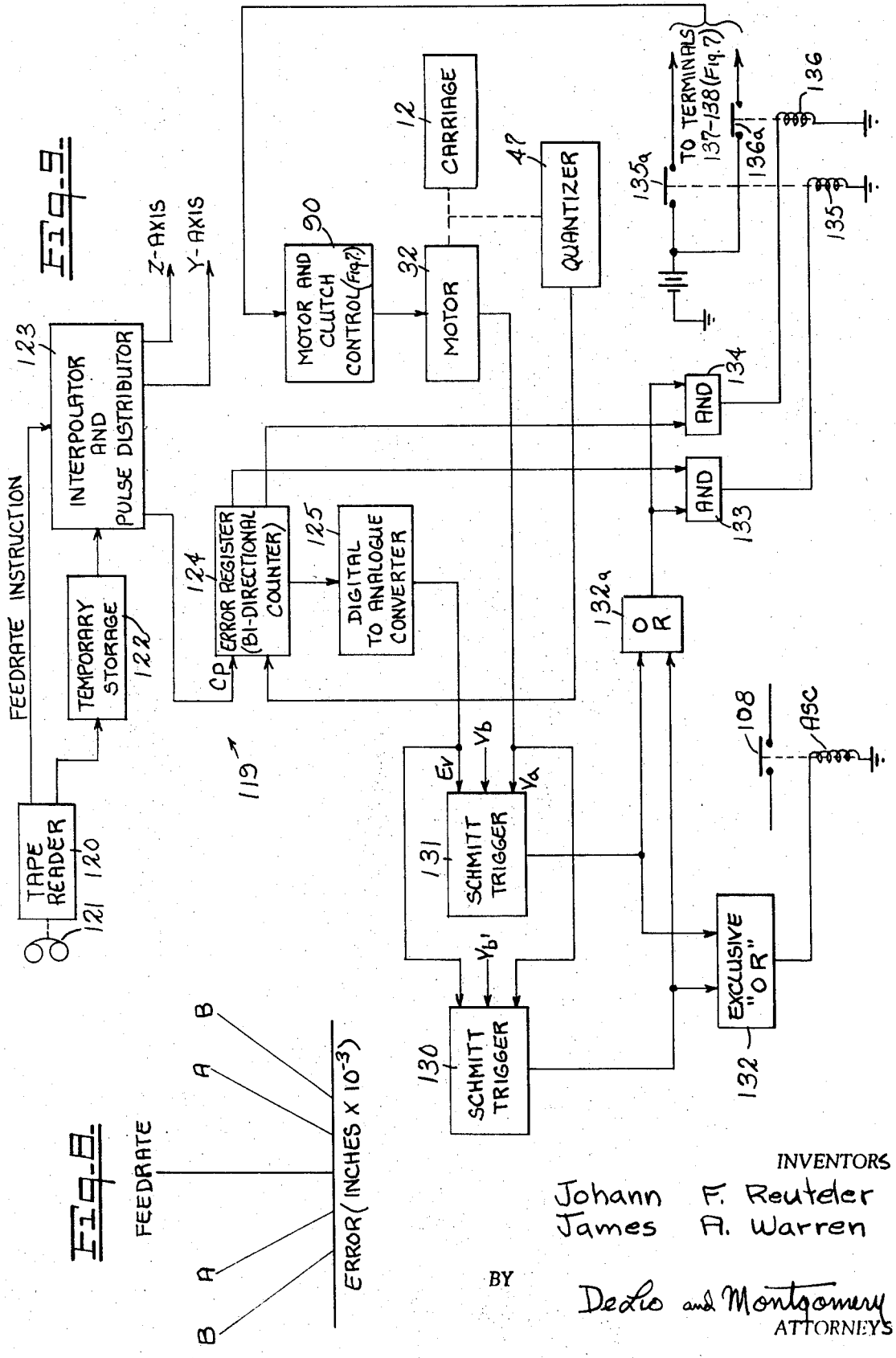

INVENTORS
Johann F. Reuteler
James A. Warren

BY
DeLio and Montgomery
ATTORNEYS

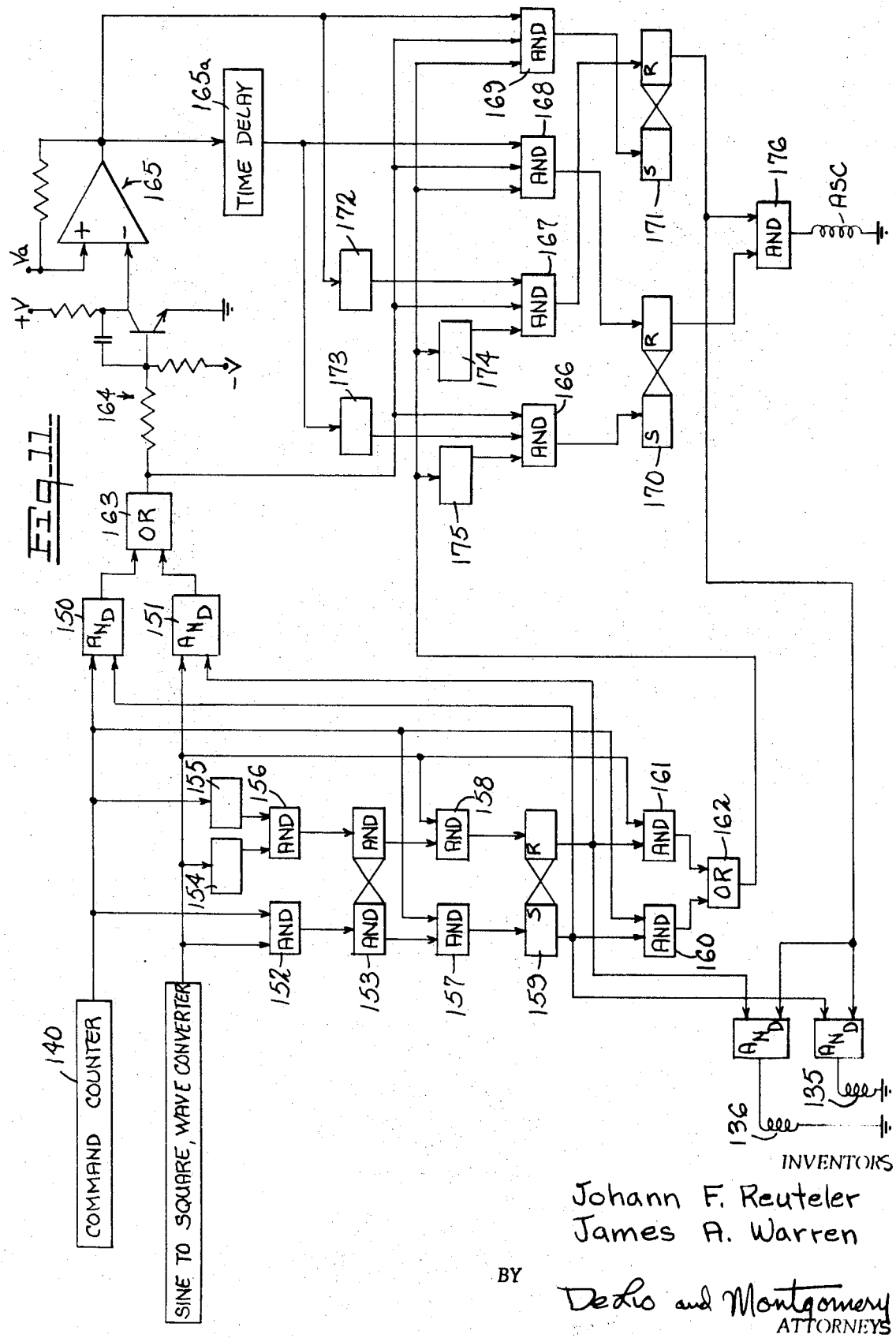

NUMERICAL MACHINE TOOL CONTROL SYSTEM INCLUDING MEANS TO DIGITALLY SIMULATE A TEMPLATE FOLLOWER

This invention relates to electric controls, and more particularly relates to electric controls for determining the relative movement of the cutting tool of a machine tool relative to a workpiece.

Prior to the advent of numerical controls for machine tools, many machine tools were of the so-called tracer type which included a stylus which through contact with a model or template caused electrical contacts to make or break. The making and breaking of these contacts controlled the slide drives of a machine tool and thus caused the cutting tool to follow a patch which the tracer followed on the model or template.

The making or breaking of these contacts would produce energization or deenergization of lead screwdrive motors or clutches. In this manner, predetermined relative paths were defined between a cutting tool and a workpiece to machine a predetermined configuration, outline, etc. on a workpiece. A pronounced characteristic of this type machine tool was the requirement for the provision of a physical model or template for the stylus to follow.

The stylus carries a contact which is spaced with respect to stationary contacts and forms gaps therewith. Upon deflection of the stylus by the model or template a spaced gap is crossed and contact is made to energize a drive clutch in the appropriate direction. Similarly, the stylus may be deflected to break a contact, cause a drive clutch to become deenergized and interrupt motion in a given direction.

More recently, numerical controls have been developed for controlling the relative path of a cutting tool and a workpiece in machine tools. In such numerical control systems the relative movement of the cutting tool is predetermined by means of coded record mediums such as perforated tapes.

In these numerical control systems the various machine parts are usually driven by servomechanisms which are responsive to a number of pulses received in a given length of time to control both the relative velocity and the movement of a machine part such as the toolhead or work-carrying table or bed.

Prior to the advent of numerical controls, many hundreds, if not thousands, of tracer-type machine tools were in operation. In many cases these existing machines can be operated more economically by numerical control than by tracer control, particularly in short production runs where it would not be economical to make a master model or template.

Accordingly, the present invention provides a new and improved system wherein the originally tracer-controlled machine may be controlled from numerical controls with a minimum change of existing equipment.

We have found that by providing a system which simulates tracer stylus contact closures and openings, a numerical control system may be utilized to control the movement of a tracer-type machine using the existing drives of the machines.

Briefly stated, the invention in one form thereof comprises the provision of a numerical control system, including error detectors, which simulate tracer contact closures. Then the numeric control compares slide position with desired position and produces on-off outputs in the same manner as the tracer stylus compared slide position with desired position, as indicated by the model, and gave the necessary contact closures. The invention further provides means for simulating contact gap in proportion to slide velocity. This provides a considerable degree of slide lag proportional to slide velocity. This feature allows stability and minimizes cutter path error caused by slide position lag.

An object of this invention is to provide a new and improved control for tracer-type machine tools.

Another object of this invention is to provide a new and improved numeric control which may be utilized to control an original tracer stylus-type machine tool.

Another object of this invention is to provide a numerical control system including means for producing errors for use in a numerical control system which simulates tracer contact closures.

A still further object of this invention is to provide a system of the type described in which the simulated contact gap is proportional to slide velocity.

Still another object of this invention is to provide a system of the type described which decreases the hunting of the tracer-controlled machine and thus minimizes the number of step marks on a workpiece.

Still another object of this invention is to provide a control of the type described where the slide lag is essentially proportional to slide velocity along each axis of motion.

The features of the invention which are believed to be novel are particularly pointed out and distinctly claimed in the concluding portion of this specification. However, the invention both as to its organization and operation, together with further objects and advantages thereof may best be appreciated by reference to the following detailed description taken in conjunction with the drawings in which:

FIG. 2 is a diagram of the drive mechanism for the controlled parts of the machine of FIG. 1;

FIG. 3 is a view in longitudinal half section of the tracer assembly of the machine of FIG. 1;

FIG. 4 is a sectional view seen in the plane of lines 4—4 of FIG. 3;

FIG. 5 is a diagrammatic representation of mechanism for remotely orienting a bias on the tracer of FIG. 3;

FIG. 6 is a view of a workpiece and model on the machine of FIG. 1;

FIG. 7 is a schematic diagram of the circuitry for controlling the drive mechanism of FIG. 2;

FIG. 8 is a diagram graphically illustrating the relation of slide position error and feedrate;

FIG. 9 is a diagram, partly in block form and partly schematic, illustrating a numerical control system arranged to control operation of the machine of FIGS. 1—8.

FIG. 11 is a diagram, partly in block form and partly schematic, of a modification of the system of FIG. 10.

Figure 1:
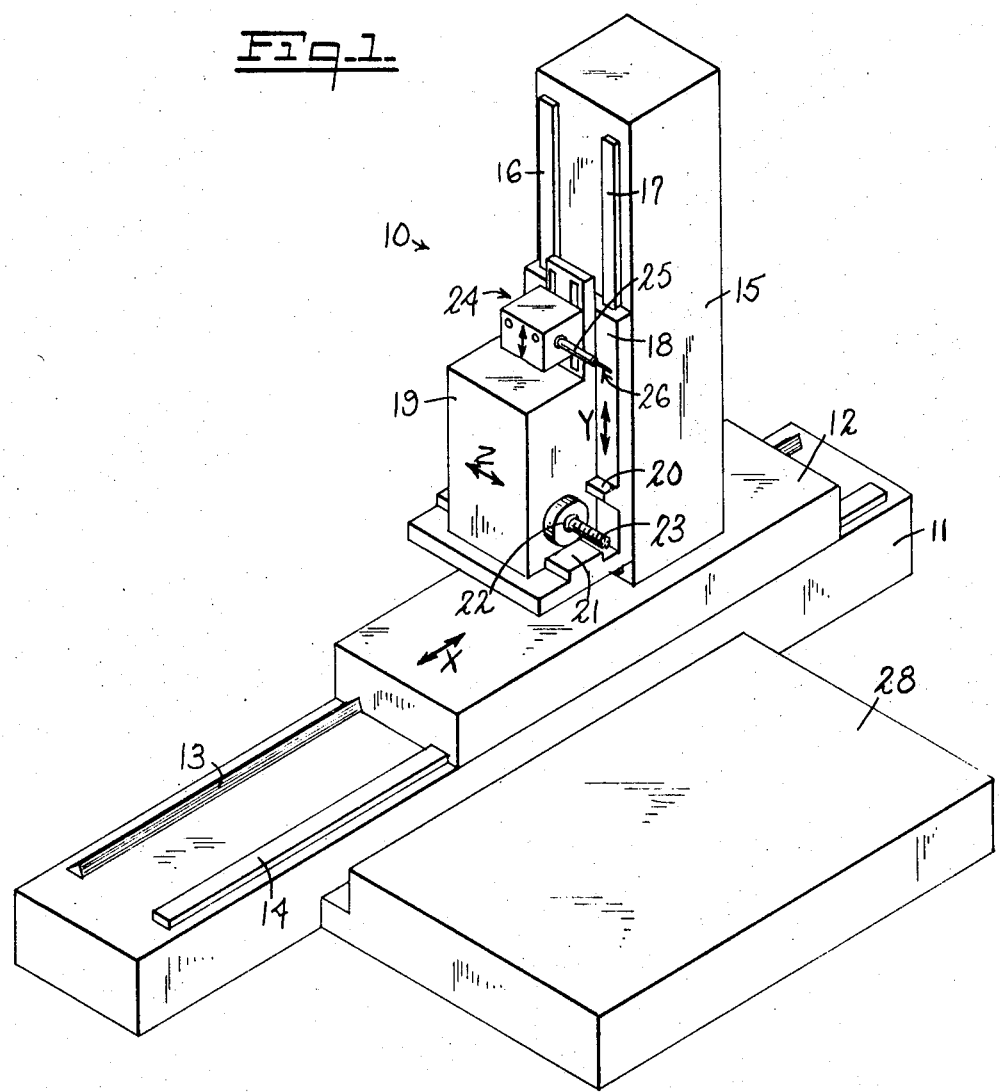
FIG. 1 is a view in perspective of a machine tool of the type in which this invention may be embodied.

A machine tool 10 to which the invention is applicable is illustrated in FIG. 1 and basically comprises a bed 11 which carries thereon a carriage 12 movable along the length of the bed on ways 13 and 14 along the X-axis. Extending upwardly from carriage 12 is a column 15 having ways 16 and 17 defined thereon. Vertically movable on ways 16 and 17 along the Y-axis is a vertical slide 18. A spindlehead 19 is movable on slide 18 on ways 20 and 21 in the Z-axis. Head 19 carries a spindle 22 shown with a cutting tool 23 therein. Also carried on slide 18 and movable with head 19 is a tracer assembly 24 which includes a tracer arm 25 with tracer stylus 26 extending from housing 27. In operation, the tracer stylus 26 engages an edge periphery or surface of a workpiece carried on a worktable 28 either directly or through a vertical fixture (not shown in FIG. 1) mounted thereon. As will hereinafter be described, the tracer stylus in tracing the outline or contour of a template or model causes the cutting tool 23 to follow the motion of the tracer on a workpiece.

The drive for each of the movable controlled machine parts 12, 18 and 19 is exemplified in FIG. 2 by the drive for carriage 12. Carriage 12 is driven through a lead screw 30 received in a traveling nut 31 affixed to the base of carriage 12. The direction of motion of carriage 12 will depend upon the direction of rotation of lead screw 30. Lead screw 30 is driven from a motor 32 which drives a pulley 33 on a shaft 34 through a belt 35 about pulley 36 on the shaft of motor 32. A gear 37 on shaft 34 engages an idler gear 38 which, in turn, engages reversing gear 39 on a shaft 40.

Lead screw 30 is driven directly from shaft 34 through a magnetically operated clutch 41 when clutch 41 is energized. When clutch 41 is energized, a similar clutch 42 on shaft 40 is deenergized. For the opposite direction of movement of table 12 and direction of rotation of lead screw 30, clutch 42 may be energized so that shaft 40 drives gear 43 which engages gear 44 on lead screw 30. At this time, clutch 41 is deenergized. Thus, by energizing one clutch and deenergizing the other, the direction of rotation of lead screw and, hence, the direction of movement of carriage 12 is determined. To measure the movement of carriage 12 a rack 45 is affixed thereto or to a nut 31, as illustrated. Driven by motion of rack 45 is a pinion 46 which drives a quantizer 47, hereinafter more fully explained.

The tracer assembly 24 is shown most clearly in FIGS. 3 and 4. The tracer assembly 24 includes the housing 27, and the arm 25, which may also be termed a barrel or sleeve. A tracer spindle 50 is positioned axially within sleeve 25 and is supported near the front end thereof by a ball and socket joint 51 and at its rear end by a plunger 52 received in a sleeve 53 and biased outwardly by a spring 54 whose tension may be adjusted by means of screw 55. The spindle receives in the end thereof a tracer stylus 56 adapted to contact a model or template. Disposed about the spindle at the rear end thereof is a contact ring 57 adapted to make or break electrical contact with contacts 58, 59, 60 and 61 disposed in the four cardinal directions. As will hereinafter be described, the contacts 58 and 59 determine the direction of vertical (Y-axis) motion and the contacts 60 and 61 determine the direction of horizontal (X-axis) motion. The end of spindle 50 is attached by means of a bias spring 62 to a stud 63 extending from a rotatable plate 64. Plate 64 is rotated by a selsyn receiver 65 received within housing 27 for purposes hereinafter described. A plunger 66 under the bias of spring 67 bears on plate 64 to prevent undesired rotation thereof. A collar 69 having a flange 70 is disposed about tracer spindle 50 and through an adjusting screw 71 may act on a pivoted arm 72 which carries thereon a switch arm 73 adapted to make or break contact with contacts 74 and 75. The position of arm 73 is initially predetermined by a spring bias adjustment 76. With this arrangement in and out (Z-axis) motion of stylus 56 is sensed. If the stylus moves axially into the sleeve, flange 70 will cause arm 72 to close contact arm 73 against contact 74.

The operation of the tracer during tracer-controlled operation will now be briefly described. Assume that the machine is to operate on a workpiece W which is to be cut in the shape of a model or template T (FIG. 6). The workpiece W and model are mounted to a vertical fixture 28a on table 28. The operator, through a calibrating disc 82 on a selsyn transmitter 83, would cause disc 64 with stud 63 and spring 62 thereon to rotate to a position where the tracer contact ring 57 was biased predominantly towards contact 58 and also to a lesser extent towards contact 60 so it would operate in generally a north-by-northeast direction, the major component of direction of the spindle being north, and the general slope of travel being indicated by the line 84 (FIG. 6). As the tracer spindle travels upwardly, it is also moved outwardly to the right, or east, as viewed in FIG. 6. However, at certain points along the path the spindle may be moved away from contact 58 by contact with the template T. While the tracer stylus moves in a generally northeastly direction the stylus will, from time to time, be moved by model T into contact with contact 61. This will produce motion of carriage 12 along bed 11, or X-axis motion of the cutting tool is produced. In this manner, the cutting tool progresses in a combination of vertical and horizontal steps along the desired path called for by the model. As the tracer spindle 56 moves along the path of the model, the cutting tool 23 is caused to follow on the workpiece W. Thus, in effect, the cutting tool 23 makes very small steps in the cardinal directions to define the resultant desired path on the workpiece. It is the opening and closing of the contacts with contact ring 57 which energizes the clutches 41 and 42 to cause the proper direction and increment of motion of the cutting tool in the coordinate cardinal directions. When the general direction of desired motion becomes predominantly horizontal, the operator adjusts spring 62 by turning disc 64.

Therefore, when the tool is to be operated under numerical control the opening and closing of the tracer contacts must be simulated.

Under tracer control the gap between the contacts 58, 59, 60, 61 and contact ring may be adjusted. Additionally, it may be noted that contact ring 57 has two diameters to provide two different gaps for rough and finish work. Contact ring 57 is adjustable on spindle 50 to position either diameter within contacts 58—61.

Reference is now made to FIG. 7 which illustrates a circuit 90 for controlling motion of one of the machine parts along one axis of operation. Circuit 90 exemplifies the electric drive for each axis of motion. The overall control circuit comprises a conventional thyratron motor control network 91 which supplies current to the armature of motor 32 having a separately excited field 92. The bias of the grid on the thyratrons of circuit 90 may be modified by an automatic speed control circuit 93 to modify the feedrate of the machine part driven by motor 32.

The coils 41a and 42a of clutches 41 and 42, respectively, may be energized to close the respective clutches through a clutch control network 94 which comprises a pair of thyratrons 95 and 96, each having one of coils 41a and 42a, respectively, in its plate of circuit. The plate circuit of thyratrons 95 and 96 includes capacitors 97 and 98, respectively. Connected between the midpoint of capacitors 97, 98 and the clutch coils 41a and 42a is the primary winding 99P of transformer 99 having a secondary winding 99S. The thyratrons 95 and 96 fire in response to contact ring 57 making contact with contact 60 and 61, respectively. If contact 60 is closed, relay 60a is energized, picking up its contact 60b in the grid circuit of thyratron 95. Similarly, if contact 61 is closed it will pick up its relay 61a which, in turn, picks up its contact 61b in the grid circuit of thyratron 96. These signals are applied to OR circuits 100 and 101 which may also receive through the lines 100a and 101a a signal for traverse or jog control. The signals derived from the closing of contacts 60 and 61 will bias the grids of thyratrons 95 and 96, respectively, past the firing point if contacts 103a and 103b are closed by energizing relay 103. These contacts are opened if selector switch 104 is set to contact NC for numerical control mode of operation. When switch 104 is set to contact NC relay 105 is energized and picks up its contacts 105a and 105b. In this mode the tracer has no control over motion of cutting tool 23.

In the automatic speed control mode of operation, the speeds of motion called for by the tracer are varied in proportion to the slope of the shape being followed in such a manner as to approximately maintain a constant surface speed regardless of shape of the model or workpiece. When one of clutch coils 41a or 41b is energized and the associated thyratron is conductive current will flow through the primary 99P of transformer 99. This induces an AC voltage in the secondary 99S which is rectified by rectifiers 110, and capacitor 111 charges through resistor 112. When capacitor 111 charges, the DC reference voltage applied to the grids of the thyratrons of circuit 91 over line 113 causes the motor speed to accelerate. The motor will accelerate at the same rate as the voltage on capacitor 111 is increasing. The maximum speed of the motor will depend upon the setting of a speed control potentiometer 114. When current from both of the clutch coils is interrupted, the AC voltage at the secondary of transformer 99 goes to zero. Capacitor 111 will be charged up so long as a clutch is energized. However, capacitor 111 will discharge when neither clutch is energized and if contact 108 is closed through diodes 115 and resistance 116, which is of lesser resistance value than charging resistance 112.

As will hereinafter be described, the speed of the drive motor as determined by either its back EMF or armature voltage $V_a$ is utilized in control of the simulation of the closures of contacts in the numerical control mode. This voltage may be derived as by a potentiometer 117 connected across the armature windings of motor and filtered through a filter network 118 to produce a voltage $Va$ proportional to motor velocity and, hence, the feedrate of carriage 12.

In a contouring or profiling servosystem the servoposition errors of the controlled parts at any given time should be proportional to the velocity along the associated axis to assure proper movement of the cutting tool with respect to the workpiece. To accomplish this in the present system, under numeric control, the simulated gap between the contact ring 57 and the contacts 58—61 is varied automatically with the speed or feedrate of the controlled part. A voltage is derived which is proportional to the velocity component of its axis. This voltage $Va$ is derived from the armature voltage of motor 32 as shown in FIG. 7 or, alternatively, may be derived as by means of a tachometer. This derived velocity voltage is then utilized to control the automatic speed control network 93, FIG. 7.

Reference is now made to FIG. 8 which graphically illustrates the relationship between motor speed or feedrate and the servoposition error in thousandths of inches. If the servoposition error falls within the curves A, no drive clutch is energized and the automatic speed control capacitor 111 is discharged. If the position error is such that it falls between the curves A and B, dependent on the direction of movement, one clutch is energized and the charge on capacitor 111 is maintained by opening switch 108. If the error resides outside of the curve B, a clutch is energized, switch 108 is closed, capacitor 111 will charge, increase the bias of the grids of thyratron subcircuit 91, then accelerate the speed of the motor and, hence, increase the feedrate of the part controlled thereby, to keep the position error proportional to the velocity. The optimum range of operation is between the curves A and B.

Reference is now made to FIG. 9 which exemplifies a contouring numerical control system which may be used in conjunction with the disclosed machine. This numerical control system 119 generally comprises a tape reader 120 adapted to read encoded information from a perforated tape 121. The encoded information is applied to a temporary storage section 122. Upon completion of a given command, new information is transferred to an interpolator and pulse distributor 123 which produces a plurality of pulse trains for each axis servo where each pulse train contains a number of pulses proportional to the distance of movement of a controlled part along its axis and at a frequency proportional to the velocity component along that axis. In the illustrated system, only the X-axis servo is exemplified, the Y-axis servos being identical. Pulses for the X-axis movement of carriage 12 are applied to an error register 124 in the form of a bidirectional counter which also receives feedback pulses from quantizer 47. The command pulses applied from the interpolator are each indicative of a commanded increment of motion and each pulse from the quantizer is indicative of an actual increment of motion. The resulting number held in the error register indicates the servoposition error and under normal circumstances would be applied to a servoamplifier which would energize a motor to drive a machine part. Such a system is disclosed in the copending application of Johann Reuteler, Ser. No. 349,215, filed Mar. 4, 1964. However, in accordance with this invention the digitally expressed position error in register 124 is applied to a digital-to-analogue converter 125 and converted into an analogue voltage $Ev$, which is indicative of the position error of the carriage 12 along the X-axis. The position error is the difference in the commanded position as represented by the command pulses CP from interpolator 123 and the feedback pulses from quantizer 47. The sign of the number in the counter represents the commanded direction of motion of carriage 12.

The voltage $Ev$ proportional to position error is compared with the velocity voltage $Va$ in Schmitt trigger circuits 130 and 131.

The Schmitt trigger circuits are well known to those skilled in the art and function to produce an output of predetermined magnitude so long as the input signal exceeds a threshold level. In the present situation a variable threshold level is established by the signal $Va$ which acts as a bias and the input signal is the position error signal $Ev$. The triggers also receive biasing signals $Vb$ and $Vb'$ establishing minimum threshold levels. The signal $Vb'$ is greater than $Vb$ thus requiring $Ev$ to exceed $Va$ by a greater amount in trigger 131 than in trigger 130 before trigger 131 fires. The unequal biasing of the Schmitt triggers determines the curves A and B.

If the position error voltage $Ev$ is greater than the velocity error voltage $Va$ by a predetermined magnitude, trigger 130 fires. This applies a signal to exclusive "OR" circuit 132. "OR" circuit 132 normally maintains relay ASC energized with a signal output. "OR" circuit 132 has an output when there is either no input or inputs from both of triggers 130 and 131.

If the velocity or feedrate voltage $Va$ is smaller than the position error voltage $Ev$, one or both of triggers 130 and 131 fire. The outputs of both triggers are applied to the "OR" circuit 132a and the output of the "OR" circuit 132 is applied to coincidence gates 133 and 134 which also receive directional information from counter 124. The appropriate coincidence gate will apply a signal to one of relays 135 or 136 which will close its contact 135a or 136a and apply a voltage to one of terminals 137 or 138 in the grid circuits of thyratrons 95 and 96. This results in energizing one of clutch coils 41a or 41b and enabling the drive means of FIG. 2. This simulates the making of the tracer contacts.

However, if the velocity voltage $Va$ is greater than the position voltage $Ev$ then the error is small and neither drive clutch is energized. This simulates the condition that the tracer contact ring 57 does not touch a contact.

The signals $Ev$ and $Va$ are further utilized in the Schmitt triggers 130 and 131 to control switch 108 and the charging and discharging of capacitor 111.

If the error resides within the curves A, no clutch is energized and the automatic speed control capacitor 111 is discharged.

With reference to FIG. 8, as the position error voltage $Ev$ increases with respect to the velocity voltage $Va$, Schmitt trigger 130 will fire and apply a signal to exclusive "OR" circuit 132. This will prevent exclusive "OR" circuit 132 from providing an output and will deenergize relay ASC which controls contact 108, and contact 108 will open. This occurs when the position error is within the curves A and B. The motor 32 will then operate at a speed determined by the charge on capacitor 111. If now the position error increases such that it is without the curves B, the second Schmitt trigger 131 will fire providing two inputs to exclusive "OR" circuit 132. Two inputs to exclusive "OR" circuit 132 produce no output and relay ASC will become deenergized and close contact 108. At this time one of the clutch coils 41a and 42a is energized and capacitor 111 charges which increases the bias at the grids of the thyratrons of network 91 and, hence, increases the speed of motor 32, which acts to decrease the position error. As the position error decreases and falls within the curves A and B, Schmitt trigger 131 will turn off, exclusive "OR" circuit 132 will provide a signal to relay ASC which will become energized, contact 108 will open and the charge on capacitor 111 will remain substantially constant until the position error further decreases to such a value that it falls within the curves A, at which time neither Schmitt trigger has an output and exclusive "OR" circuit 132 again energizes relay ASC to close contact 108 and allow capacitor 111 to discharge through diodes 115 and resistance 116. During this discharge there is no charging current inasmuch as both clutch coils 41a and 42a are deenergized.

Through the operation of the network described, the position error remains proportional to the slide velocity within a predetermined range. This minimizes cutter path errors caused by position error or lag. The velocity voltage $Va$ simulates the tracer contact gaps as a function of slide velocity or feedrate. This assures stability at high slide feedrates and maximum accuracy at low feedrates.

Figure 10:
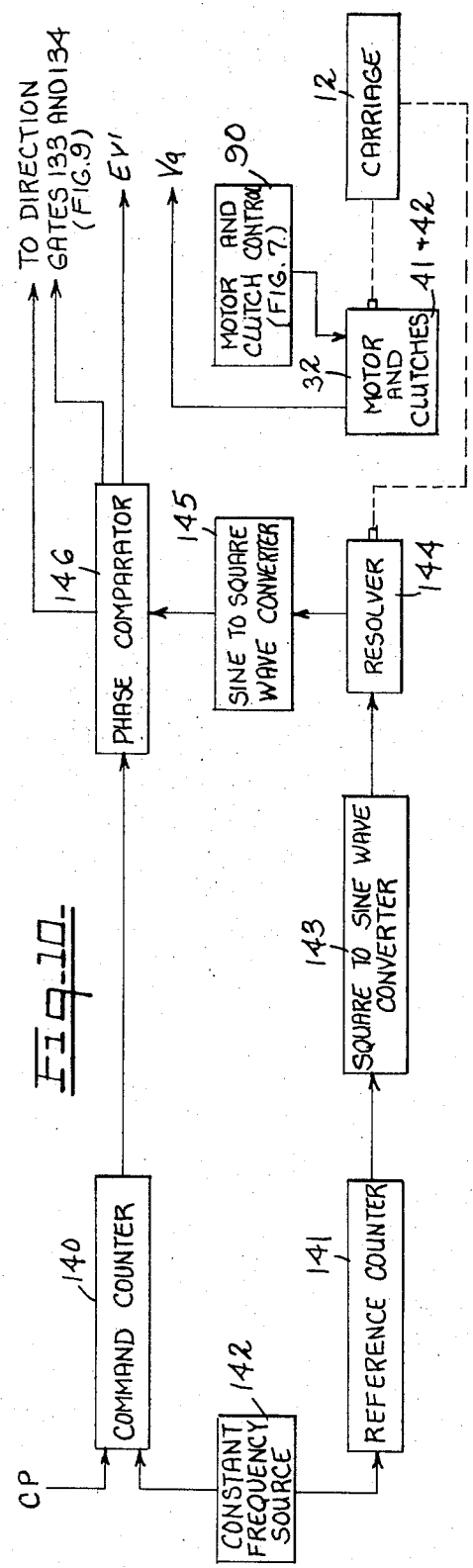
FIG. 10 is a diagram, partly in block form and partly schematic of another numerical control system, arranged to control operation of the machine of FIGS. 1-8.

The invention may utilize various types of pulse responsive servosystems including those of the resolver type. FIG. 10 illustrates such a system which includes a command counter 140, a reference counter 141, a source of constant frequency pulses 142 which applies pulses to each of command counter 140 and reference counter 141. The command pulses CP of the interpolator 123 (not shown in FIG. 10) are applied to command counter 140. If only the constant frequency pulse source applies pulses to the counters 140 and 141 which have the same number of bits, both counters will overflow at the same time and there will be no phase difference in their output. However, command counter 140, if incremented or decremented by command pulses CP, will overflow prior to or subsequent to overflow of the reference counter and a phase difference will be established. The output of the reference counter is applied to a square-to-sine wave converter 143 which, in simplest form, may merely be a filter and the sine wave then applied to the rotor winding of a phase resolver 144. The rotor of the phase resolver is also driven by carriage 12 through a rack and pinion. The voltage output of the phase resolver, the phase of which is dependent upon the position of the rotor relative to the stator windings, is introduced to a sine-to-square wave converter 145 which in a simple form may be a Schmitt trigger circuit. The output of the sine-to-square wave converter, together with the overflow pulses of command counter 140, are applied to a phase comparator of discriminator 146. The comparator 146 produces at its output a DC error voltage having a magnitude dependent upon the difference in phase between the output of command counter 140 and the output of sine-to-square wave converter 145. In essence, this is a measure of the difference in phase of the overflow pulses from reference counter 141 and command counter 140 modified by the angular position of the resolver rotor. This voltage $Ev'$ is the position error voltage. $Ev'$ is then compared with the velocity voltage $Va$ in the same manner as shown in FIG. 9. The direction indications may be derived from the phase relationships in comparator 146.

Figure 12:
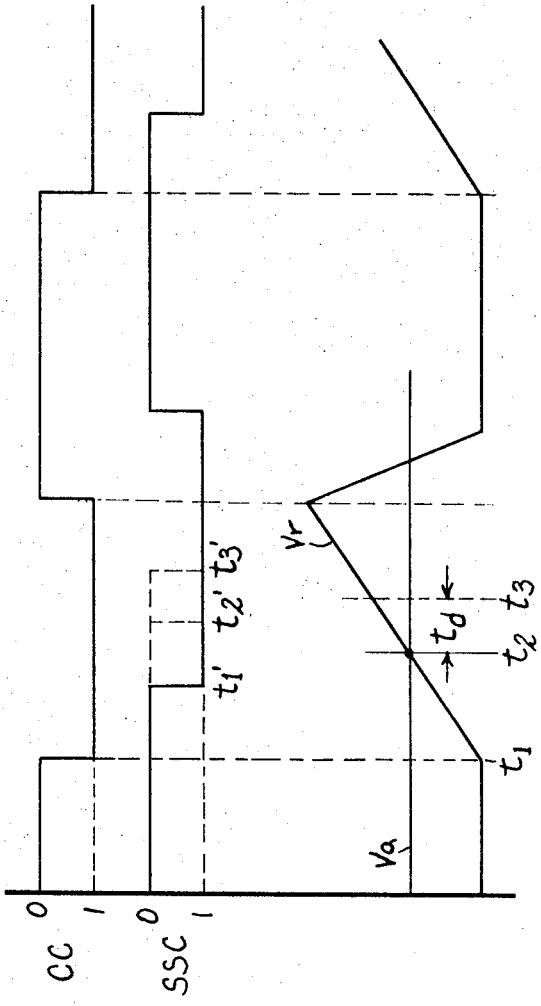
FIG. 12 is a graphical representation of the waveforms occurring in the network of FIG. 11.

The velocity signal and the error signal may be compared in still another way using the resolver-type servosystem of FIG. 10. Reference is made to FIG. 12 which exemplifies two waveforms CC and SSC which may be considered as the overflow waveform of command counter 140 and the output of sine-to-square wave converter 145. The lag of wave SSC behind CC represents the position lag. In response to the leading wave, a ramp function voltage $Vr$ is generated which is compared with the velocity signal $Va$. By determining the relative position where $Vr=Va$ and the occurrence of a change in the lagging wave, the switching points of the curves A and B, FIG. 8 may be determined. In FIG. 12, the ramp function voltage $Vr$ is initiated at time $t_1$ when the leading wave CC switches to a low level which is a logic "1." The ramp function voltage $Vr$ continues for the first half cycle of the leading wave. At the time $t_3$ when $Vr=Va$ a time delay $t_d$ is initiated which lasts for $t_3-t_2$. This time delay corresponds to the area between the curves A and B, FIG. 8 and is analogous to the difference in the biases $Vb$ and $Vb'$ on Schmitt triggers 130 and 131, FIG. 9.

To determine the magnitude of the position lag or error the time at which $V4=Va$ may be sensed with respect to the phase difference of waves CC and SSC. The phase shift may be detected with respect to $Va$ as 1. The lagging wave changes magnitude before $Vr=Va$,
2. The lagging wave changes magnitude during time delay $t_d$, and
3. The lagging wave changes magnitude after time delay $t_d$.

In condition (1) the position lag is small and within curves A, FIG. 8. In condition (2) the position lag falls within the curves A and B, and in condition (3) the position error is without the curves B.

These conditions may be sensed to indicate the magnitude of the position lag or error and initiate a velocity modification, if necessary, as shown in FIG. 11.

In FIG. 11, the various "AND" and "OR" gates and memories are composed of "NOR" logic which yields a zero level signal when there is a "1" level input, and a high level output when there is a "0" input. This type of circuitry is disclosed in the copending application of Johann Reuteler, Ser. No. 349,215, filed Mar. 4, 1964. A low level signal represents a logical "1," and a high level signal represents a logical "O."

The waves CC and SSC are applied to coincidence gates 150 and 151, respectively, one of which is opened when it is determined which is the leading wave. To determine which wave is leading both signals are applied to a gate 152 which sets a memory or flip-flop 153 when both waves are "1." Both signals are also applied through inverters 154 and 155 to a coincidence gate 156 which resets memory 153 when both waves are "O." The outputs of memory 153 are applied to coincidence gates 157 and 158 together with the waves CC and SSC, respectively.

If memory 153 is set and wave CC is "1," then gate 157 sets memory 159 to indicate that wave CC is leading wave SSC. Conversely, if gate 158 resets memory 159, this indicates wave SSC is leading. The outputs of memory 159 are then applied as gating signals to gates 150 and 151, respectively. If memory 159 is set, it will enable gate 150 to pass wave CC.

Gates 160 and 161 receive the set and reset signals of memory 159 and the waves CC and SSC, respectively. One of these gates will open when the lagging wave changes to a "1" and "OR" gate 162 will change from a "0" to a "1" output when this occurs. Gate 162 thus senses the change from "0" to "1" of the lagging wave.

The leading wave is passed by an "OR" gate 163 to a ramp function generator in the form of a Miller integrator 164. The output $Vr$ of integrator 164 together with the velocity voltage $Va$ are applied to a differential amplifier 165 which is normally saturated, but switches to another state when $Vr=Va$. The output of differential amplifier 165 is "0" until $Vr=Va$, then it switches to "1," and to a time delay circuit 166 which provides an output signal a predetermined time $t_d$ after receipt of a signal from amplifier 165. The three conditions set forth above may now be determined from gates 166, 167, 168, 169 and memories 170 and 171. The output of time delay circuit 165a is applied directly to gates 168 and 169 and through inverters 172 and 173 to gates 166 and 167. The inputs to gates 168 and 169 is "1" and enables these gates if $Vr$ has not risen to $Va$ and amplifier 165 switched. The inputs from time delay circuit 165a enable gates 166 and 167 during time delay $t_d$ following switching of amplifier 165. The output of gate 163 enables all of gates 166—169 during the "1" level of the leading wave. With this logic input to gates 166—169, selected ones will fire upon the output of gate changing. When gate 162 has a "1" output gates 168 and 169 are enabled and gates 166 and 167 are inhibited through inverters 174 and 175. When 162 has a "0" output, the reverse conditions apply.

Refer to FIG. 12 and particularly the change in the lagging waveform "0" to "1" at times $t_1'$, $t_2'$, and $t_3$. At time $t_1'$ the lagging wave changes prior to $Vr=Va$. Therefore gates 166 and 167 receive a "0" through inverters 174 and 175 and are inhibited. Since the amplifier 165 has not switched to indicate that $Vr=Va$, gate 168 has all "1" inputs and it will reset memory 170. Gate 169 also has all "1" inputs and it will set memory 171. This states that the position lag or error is within the curves A, FIG. 8.

If the lagging wave should change to "1" during the time delay $t_d$ at time $t_2'$, gates 166 and 167 are enabled from time delay circuit 165a and amplifier 165, respectively, the "0" outputs of gate 162 is inverted to "1" by inverters 174 and 175, and gates 166 and 167 are completely enabled and fire, resetting memories 170 and 171. Gates 168 and 169 are inhibited at this time by the output of gate 162. When memories 170 and 171 are reset they indicate that the position error is within the curves A and B. This may be sensed by gate 176.

If the lagging wave should change to "1" after the time delay $t_d$ at time $t_3'$ gates 166 and 168 would be enabled to fire, set memory 170 and reset memory 171.

With the error range thus determined, thyratrons 95 and 96 may be fired by closing contacts 135a or 136a of relays 135 and 136 by deriving from memory 171 information that the position error is within curves A, together with directional information from memory 159. Additionally, the relay ASC may be controlled from gate 176.

It may thus be seen that the servoposition lag or error indication may be derived and compared with the velocity or feedrate signal in a number of techniques. While the examples set forth generally speak of the position error being detected when an equality exists between the position lag or error system, it is to be understood that the error may be detected upon any predetermined relationship of these signals considering biasing, proportionality factors, etc.

It may thus be seen that the objects of the invention set forth as well as those made apparent from the disclosure are efficiently attained. While various embodiments illustrative of the invention have been set forth for purposes of disclosure, other embodiments as well as modifications to the disclosed embodiments which do not depart from the spirit and scope of the invention may occur to those skilled in the art. Accordingly, the appended claims are intended to cover all embodiments of the invention which do not depart from the spirit and scope thereof.

We claim:

1. In a machine tool having a slide, drive means including an electric motor for moving said slide at a velocity proportional to the speed of said motor; means for generating a train of pulses each indicative of a predetermined increment of commanded motion of said slide, means for measuring the actual movement of said slide with the movement commanded by said pulses and deriving an indication of the position error therebetween, means for deriving a velocity indication of the slide, means for comparing said position error indication and said velocity indication, and means responsive to said comparing means for inhibiting said drive means if said position error indication is below a predetermined value with respect to said velocity indication and for accelerating said drive means if said position error indication is above a second predetermined relation with said velocity indication.

2. The invention of claim 1, wherein said drive means includes forward and reverse engageable clutches, a capacitor and a charging path therefor, means responsive to a first magnitude of the position error with respect to the velocity of the slide for energizing one of said clutches, means responsive to a second magnitude of the position error with respect to the velocity of the slide for enabling said capacitor-charging circuit, and means responsive to the charging of said capacitor for increasing the speed of said motor.

3. The invention of claim 2, further including means responsive to a minimum magnitude of said position error with respect to said velocity for disabling said clutches and establishing a discharge path for said capacitory.

4. The invention of claim 1, wherein said drive means includes forward and reverse engageable clutches, and means responsive to the position error reaching a predetermined magnitude with respect to said velocity for engaging one of said clutches.

5. In combination, a machine tool including a slide drive means for driving said slide, means for generating a train of command pulses where each pulse represents an increment of movement of said slide, means providing a signal proportional to the velocity of said slide, means for generating a constant frequency pulse train, first means for counting said constant frequency pulses, second means for algebraically counting said constant frequency pulses and said command pulses, a phase resolver having rotor windings, means for converting the overflow pulses of said first counting means to a sinusoidal wave and applying said sinusoidal wave to the rotor windings of said phase resolver, the rotor of said phase resolver being angularly displaced by motion of said slide, means for converting the stator waveform of said phase resolver to a rectangular waveform, means for comparing the phase relation of the overflow waveform from said first means for counting with the rectangular waveform to determine the position error of said slide with respect to said velocity signal, and means responsive to a first relationship of said waveforms relative to the magnitude of the velocity signal for inhibiting said drive means and to another relationship of said waveforms relative to the magnitude of the velocity signal for accelerating said drive means.

6. The invention of claim 5, further including means for deriving a voltage signal proportional to the position error indicated by said phase relationship, and means for comparing said voltage signal to said velocity signal to determine the position error with respect to the velocity signal.

7. The invention of claim 5, wherein said drive means for said slide comprises a motor and forward and reverse clutches, means responsive to said comparison means for disengaging said clutches when said position error is below a predetermined relation with said velocity signal and engaging one of said clutches when said position error is above said predetermined relation with said velocity signal.

8. The invention of claim 7, further including a capacitor, means providing charging and discharging circuit paths for said capacitor, means responsive to said position error being below said predetermined relation for discharging said capacitor, means responsive to said second predetermined relation for charging said capacitor and accelerating said motor with the voltage increase on said capacitor.

9. The invention of claim 8, further including means for interrupting charging of said capacitor without discharging said capacitor when the relationship of said position error falls below said second predetermined relationship but not below said predetermined relationship.

10. In combination, a machine tool having a slide, drive means for moving said slide along a predetermined path, means for generating a train of pulses each indicative of an increment of movement of said slide, means for measuring the actual movement of said slide, means responsive to the pulses of said train and said measuring means for providing in indication of the position lag of the slide behind its commanded position, means for deriving a voltage proportional to the velocity of the slide, and means responsive to a first predetermined relation of the position lag indication and the proportional voltage for inhibiting said drive means if said position error indication is below a predetermined value with respect to said velocity indication and for accelerating said drive means if said position error indication is above a second predetermined relation with said velocity indication.

11. The invention of claim 10, wherein said drive means is disconnected during a first relationship of said voltage signals, said drive means is operative during a second relation of said voltage signals at substantially constant velocity, and said drive means is operative and the velocity thereof is increased during a third relation of said voltage signals.

12. The invention of claim 10, wherein said drive means includes forward and reverse engageable clutches, a capacitor and a charging path therefor, means responsive to a first magnitude of the position error with respect to the velocity of the slide for energizing one of said clutches, means responsive to a second magnitude of the position error with respect to the velocity of the slide for enabling said capacitor-charging circuit, and means responsive to the charging of said capacitor for increasing the speed of said motor.

13. The invention of claim 12, further including means responsive to a minimum magnitude of said position error with respect to said velocity for disabling said clutches and establishing a discharge path for said capacitor.

14. For use in combination with a machine tool of the type having a cutting tool, drive means for relatively moving machine parts along predetermined axes, a tracer arm adapted to contact a template and to control the operation of said drive means, said tracer arm having an electrical contact thereon adapted to open and close contacts to deenergize and energize said drive means, said tracer arm being so positioned that upon predetermined deflection thereof it makes or breaks an electrical contact with one or more of said contacts; means for determining the position lag of each of said machine parts with respect to a commanded position, means for deriving a signal proportional to the velocity of each machine part, means for comparing the position lags with respective one of said velocity signals to derive a simulation of opening and closing the contacts, and means responsive to said simulations for controlling the operation of said drive means.

FO-1050
(5/69)

UNITED STATES PATENT OFFICE
CERTIFICATE OF CORRECTION

Patent No. 3,579,069      Dated May 18, 1971

Inventor(s) Johann F. Reuteler et al

It is certified that error appears in the above-identified patent and that said Letters Patent are hereby corrected as shown below:

Column 5, line 50, after "Y-axis" insert -- and Z-axis --. Column 7, line 29, delete "of" and insert -- or --. Column 7, line 62, delete "V4" and insert -- Vr --.

Signed and sealed this 16th day of November 1971.

(SEAL)
Attest:

EDWARD M. FLETCHER, JR.      ROBERT GOTTSCHALK
Attesting Officer      Acting Commissioner of Patents